United States Patent [19]
Pennisi et al.

[11] Patent Number: 5,659,478
[45] Date of Patent: Aug. 19, 1997

[54] RAPID PRODUCT REALIZATION PROCESS

[75] Inventors: Robert W. Pennisi, Boca Raton; Glenn F. Urbish, Coral Springs, both of Fla.

[73] Assignee: Motorola, Inc., Schaumburg, Ill.

[21] Appl. No.: 391,744

[22] Filed: Feb. 21, 1995

[51] Int. Cl.$^6$ .............. G06F 19/00; G06G 7/64; G06G 7/66

[52] U.S. Cl. .............. 364/468.01; 364/468.04; 364/468.03; 364/468.09; 364/468.12; 395/120

[58] Field of Search .............. 364/468, 401, 364/402, 469, 476, 473, 149, 151, 152, 153, 474.24, 468.01, 468.03, 468.26, 469.02, 473.01, 476.01; 395/120

[56] References Cited

U.S. PATENT DOCUMENTS

| | | | |
|---|---|---|---|
| 4,346,442 | 8/1982 | Musmanno | 364/408 |
| 4,807,108 | 2/1989 | Ben-Arieh, et al. | 364/148 |
| 5,241,465 | 8/1993 | Oba et al. | 364/402 |
| 5,249,120 | 9/1993 | Foley | 364/402 |
| 5,408,405 | 4/1995 | Mozumder et al. | 364/468 |
| 5,481,465 | 1/1996 | Itoh et al. | 364/468 |

*Primary Examiner*—Reba I. Elmore
*Assistant Examiner*—Ramesh Patel
*Attorney, Agent, or Firm*—Dale W. Dorinski

[57] ABSTRACT

A process for designing and optimally fabricating a plastic object begins by creating a surface model (215) of the object on a digital computer. The surface model contains information about the exterior of the product. A set of constraints (222) that are based on physical attributes of the product and resources available to make the product is defined, and is used to determine an optimum path (223) through a set of manufacturing processes (230) by selecting certain of those processes. A precedence relationship between the selected processes creates a set of interconnected activities. The surface model is processed (224) to convert the databank supporting the model to information that is usable by the selected processes, and this information is sent to the selected processes. Each process performs an activity in accordance with the defined precedence relationship, so that an output of the last one of the selected processes is the plastic object (235). Techniques such as surface modeling, solids modeling, stereolithography, CNC machining, and RIM molding are linked together and a common database is used to create a process of rapidly realizing a product.

24 Claims, 2 Drawing Sheets

RAPID PRODUCT REALIZATION PROCESS

TECHNICAL FIELD

This invention relates to a method for optimally fabricating a product.

BACKGROUND

The shape of electronic products is becoming more complex while at the same time the size is decreasing rapidly, imposing a high demands on an organization's design and manufacturing operations. The creation of a product requires activities interconnected to form a process for the product manufacture. In the overall product realization process a research and development organization designs the product and turns the completed design over to a manufacturing organization. The manufacturing organization develops fabrication and assembly activities that enable final assembly of the product. Normally, the design, fabrication and assembly activities are executed at different intervals of time by organizations or systems that are relatively independent of each other, in that some activities are required to be completed before work can be started on other activities. The various constraints of each system or activity can cause delays or problems in the fabrication of the product, resulting in a long delay of the product realization.

The accuracy with which product concepts are communicated to the manufacturing, development, and marketing groups directly affects the likelihood that a concept will be successfully developed into a product. Benchmark studies from the communication, automotive, and aerospace industries have shown that 60–80% of the product life-cycle costs are established during the preliminary design stage. In spite of this importance in determining product cost and time-to-market, a seamless data exchange mechanism does not exist. Even though photo-realistic renderings of computer-generated models can communicate the visual aspects of a product idea very well, they are not as effective as physical models in conveying spatial ideas and the ergonomic feel of the concept. A physical model that can actually be held and put to some practical testing produces much more information and allows the designer or artist to properly validate the concept. Therefore, the timely physical production of a mock-up or prototype of an object is an important first step in the creation and evolution of a new product. The mock-up serves as a physical representation of a designer or artist's idea or concept, and it is important that this physical model accurately represent the idea. Traditionally, the mock-up or model has been fabricated by, for example, hand-crafting models from clay, balsa wood, Styrofoam, paper mache, or other types of cheap and easily manipulated materials. Other various methods of creating a model of a product are well known to those skilled in the art, as are the problems associated with each if these techniques, for example, modern machine tools are used to mill a block of metal or plastic, and more recently, a technique known as stereolithography has been used to fabricate a plastic model from a liquid resin using a laser beam. These techniques are able to create highly accurate and complex parts. However, even when using the most sophisticated computer models and machining methods, there are numerous steps that are required in moving from the concept in the artist's mind to the finished product. Also, the resulting physical representation is usually not dimensionally accurate enough or a true representation of what the actual production version of the product will ultimately be, since many compromises must be made in moving from concept to the finished prototype. Further, the time required to create the prototype is very long, typically from several weeks (in the case of a simple product) to many months (in the case of a complex product). After all this effort and compromise, only one or two of the prototypes or models are usually realized. In many cases, it would be more desirable to have multiple units that one could concurrently subject to various types of physical and marketing tests. Clearly, an improved method of making models or prototypes is needed that more accurately conveys the idea in the artist's mind, and that is faster and more cost effective, and that provides prototypes that more closely resemble products made with the actual materials and process used in the final version.

DETAILED DESCRIPTION OF THE PREFERRED EMBODIMENT

Successful design and engineering of complex electronic products requires effective communication between the design and product development groups from the early stages of the development cycle. A data exchange methodology that includes a set of standards, operating procedures and custom Initial Graphics Exchange Specification (IGES) interface configurations facilitates this communication. Using this scheme, physical prototypes can be built directly from computer-generated models with turnaround times as short as one day. Surface and wireframe geometry is used as a template for construction of solid models, and these models are then used in other computerized manufacturing operations or processes. Details such as surface texturing and color can easily be incorporated into the prototypes.

Figure 1:
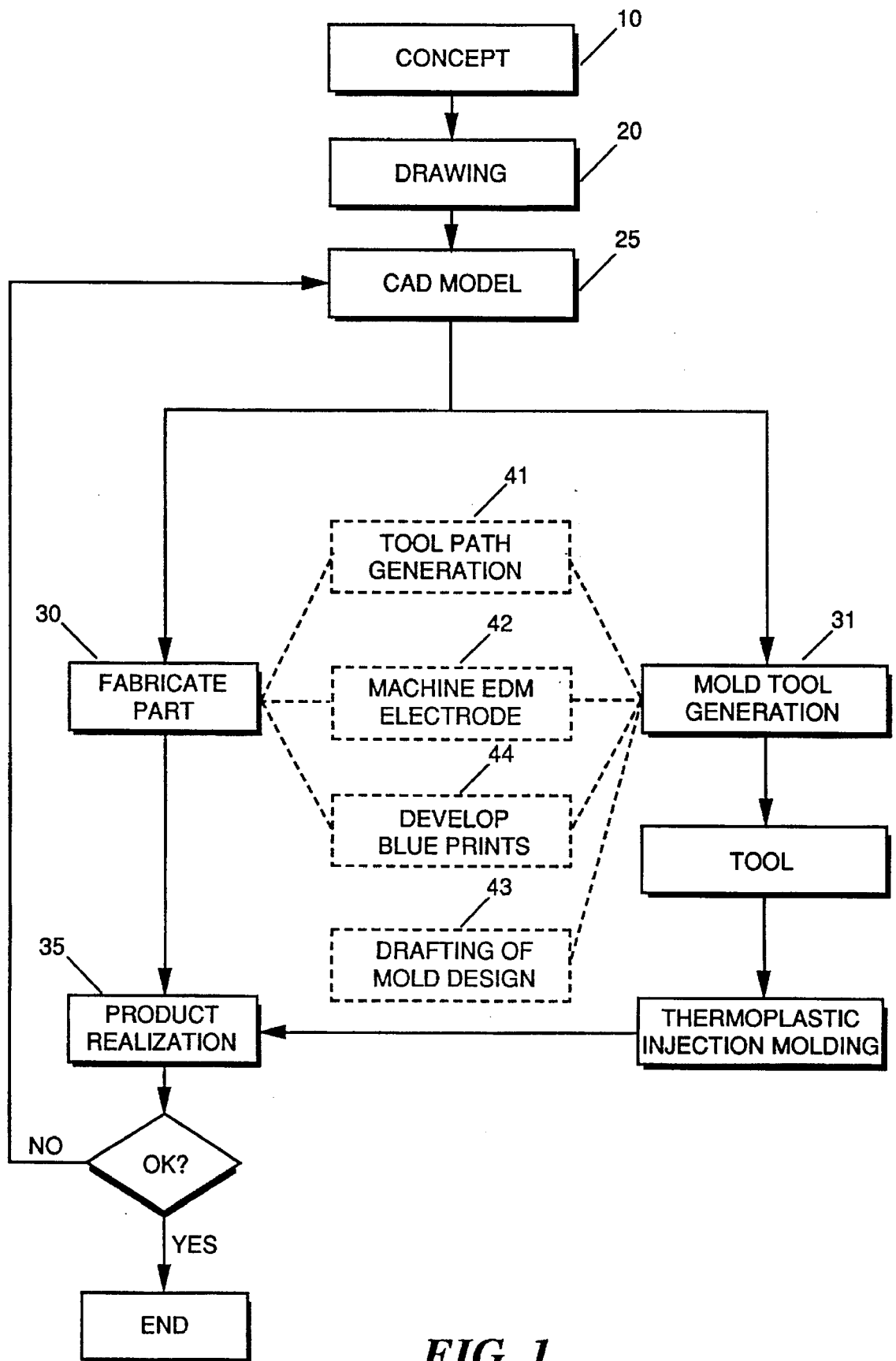
FIG. 1 is a flowchart of the method of making prototypes as conducted in the prior art.

In the prior art, the various elements of the product design, the engineering process, and the fabricating process exist as shown in FIG. 1. Product concepts 10 originate as ideas in the designer's mind and are then typically rendered as an artistic sketch, a drawing 20 or a clay model. The drawing or model 20 of the concept is typically created from scratch using the two-dimensional paper renderings by an engineer on a computer aided design (CAD) system 25, to add engineering details to the model or to conduct simulated structural testing. This CAD model forms the basis for engineering simulation and the manufacture of final products. The software tool typically used at this point is a solids modeling program such as Pro/Engineer, which is sold by Parametrics Technology Corporation, of Massachusetts. The emphasis here is on creating exact geometry of physical parts that can be used as the basis of various downstream operations 30,31 such as engineering simulations, tool design, and part manufacturing. Other ancillary activities (represented by the dashed boxes and lines) support the downstream operations 30,31 such as tool path generation 41, machining 42, designing a mold 43, creating drawings or blueprints 44, etc., and occur concurrently or serially. All of these operations eventually result in the realization of the finished product 35, which can be physically handled and examined. The engineer and the designer then attempt to reconcile the shape of the part produced from the CAD model against the artist's sketch, for accuracy of design intent, form and fit. If the part adequately meets the mechanical and design expectations, the process is finished, but if it inadequately represents the designer's concept, then the process is iterative and can be repeated many times to eventually converge to a point where the finished model closely resembles the original concept. In the optimum situation, this process consumes about 7 weeks of time from start to finish, and is typically 7–19 weeks, with cycle times extending in some cases to years. In this figure, the solid lines only indicate the paths that are used by designers and engineers to move from one manufacturing step to another, and they are not intended to imply that the functions are joined together in any particular way. In fact, in most situations, the individual operations are disjointed, and not linked together.

Figure 2:
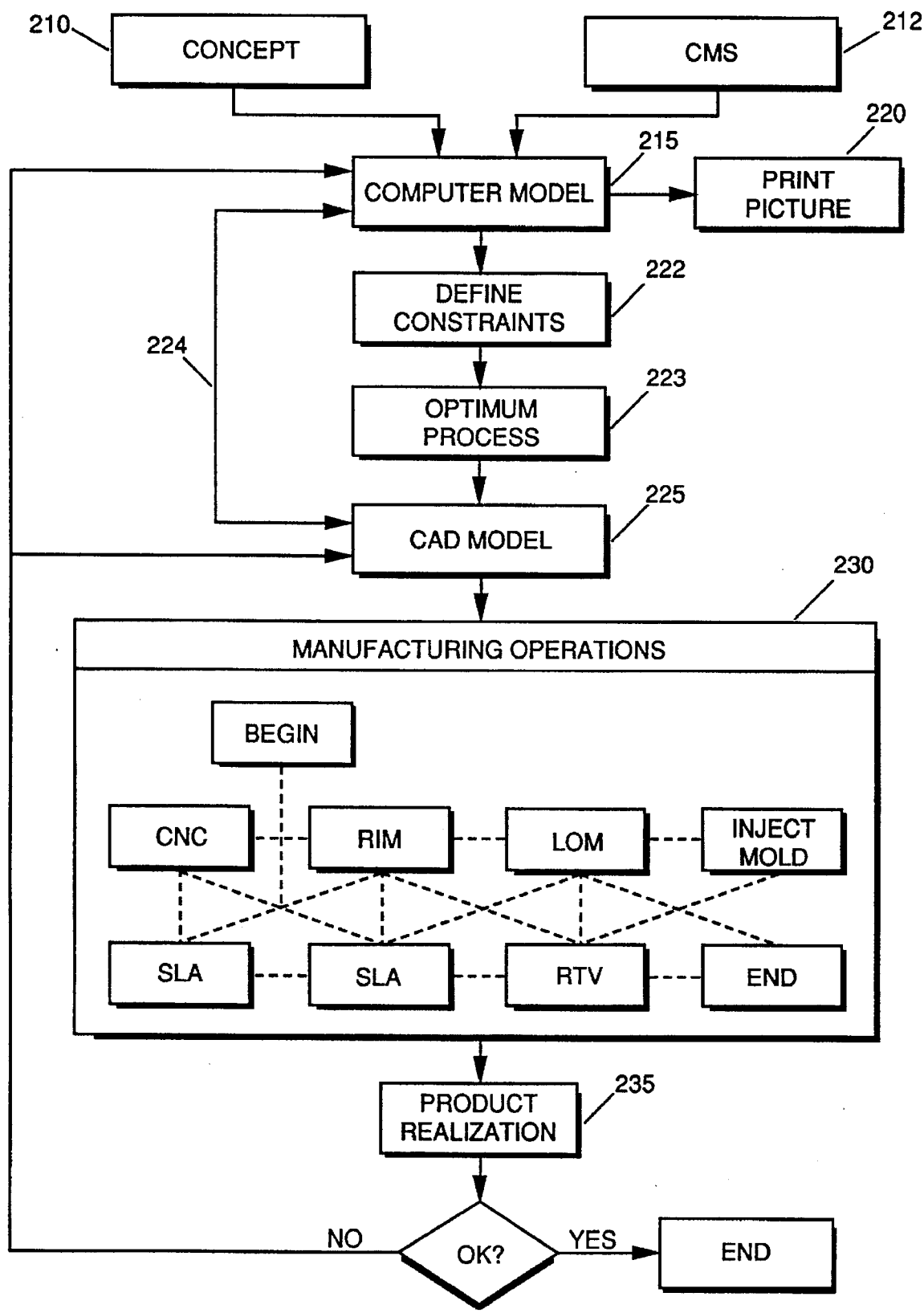
FIG. 2 is a block diagram of the design and manufacturing activities interconnected to form a product realization process embodying the principles of the invention.

Having described the product realization process as it exists in the prior art, the invention will now be summarized. Referring to FIG. 2, the product concept 210 originates as an idea in the designer's mind and is translated into a computer model 215 for rendering and visualization. The software tool of choice for designers is a surface modeling program such as Alias, which is sold by Alias Research of Toronto, Canada. Alias is designed to provide users with the ability to create geometric models of an object using free-form methods. Hence, the software uses surface modeling techniques with low mathematical precision. As the emphasis is on visualization, the designer tends to generate models with geometric definitions which are only approximate. This step in realizing a prototype, model, or mock-up of a product creates a very life-like computerized representation of the product. It is to be understood that in the context used herein, a computerized representation is a body of information (such as a databank or database) that is resident in the memory of a digital computer, corresponding to a version of what the artist or designer intends the product to be. For example, it may be a drawing of an object that has been created by an individual inputting information into the computer so that one or more programs can convert that information into a representation that is meaningful to a human. These techniques of creating computerized drawings are well known in the art, for example, a solids modeling program (such as Pro/Engineer), a surface modeling program (such as ALIAS), a wire frame program, or other drawing programs that are well known and used on personal and mainframe computers. In other cases, a physical representation of the object may already exist, and one may simply wish to translate this into a computer database. A three dimensional co-ordinate measuring system (CMS) 212 may be used to carefully measure the dimensions of the existing object to essentially create a digital representation of the object for translation to a computer readable format. These measuring systems typically use a laser or free tipped probe to accurately measure the object. After the computer model 215 is created, it may optionally be printed out on paper for review. As opposed to the prior art, the printout 220 is not used as the basis for subsequent manufacturing operations, but is simply a handy reference for the designer.

Having now created a computerized representation of the object, the designer and/or engineer defines a set of constraints 222 for manufacturing the object. The constraints are based on numerous factors that are typically weighed against each other to make decisions on how to proceed. For example:

limitations on the amount of money available to fabricate the product;

the allowable time delay until the product is realized;

the number of units of the product that are desired;

the availability of various other resources such as computers, machinery, materials, and manpower;

the level of quality of the realized product;

the degree of functionality of the realized product;

the type of material that one desires to make the product from;

the type of testing that one desires to perform on the realized product;

the complexity and level of detail in the product.

Obviously, depending on the importance of each of the factors, some will influence the decisions more heavily than others. For example, the need for a large quantity of highly precise, thin walled plastic parts may require the creation of a precise injection molding tool, and the need to realize the parts in the shortest possible time will dictate the procedure to be used in making the mold. Budgetary limitations may dictate that some compromise be made in selecting the mold-making procedure, etc. It should be clear to the reader that a very large number of possible outcomes can be chosen, depending on the particular set of constraints. The set of constrains serves as a decision tree, and may be complied manually or by a computer. Artificial intelligence programs are useful in automating the application of the set of constraints. In each case, the designer/engineer evaluates each of the constraints and inputs a yes/no answer, a qualitative answer, or a quantitative answer.

Having defined the set of constraints 222, the optimum process 223 of realizing the product can now be chosen. The optimum process 228 is a structured set of manufacturing operations or activities that lie on an optimum path through these operations. As depicted in FIG. 2, the set of manufacturing operations 230 consists of many possible manufacturing activities that may be employed to accomplish the rapid product realization process, and clearly not all are chosen to be on any one particular optimum path. The drawing is intended to show that many combinations are possible, and that an optimum path consists of some specified direction through this multiplicity of activities. On the optimum path, as designated by the maze of dashed lines connecting the individual activities in the manufacturing operations 230, only a handful of these activities are needed to create the product. So, the optimum process 223 would consist of a well defined subset of the manufacturing activities arranged in some order, as dictated by the set of constraints. A partial, but not complete, listing of some of the types of manufacturing activities or operations includes:

Blow molding
Computer numerically controlled machining (CNC)
Direct light fabrication
Direct shell production casting
Extruding plastic
Fused deposition modeling
Laminated object manufacturing (LOM)
Lost wax casting
Modular mold technology
Molding with room temperature vulcanizing silicone or urethane elastomers (RTV)
Precision stream droplet manufacturing
Reaction injection molding plastic (RIM)
Selective laser sintering (SLS)
Solid creation systems
Solid ground curing
Spray metal technology
Stereolithography (SLA)
Thermocompression molding
Thermoforming
Thermoplastic injection molding
Thermoset molding Three-dimensional printing
Vacuum forming In determining the optimum path, each of the potential manufacturing activities is evaluated based on the set of constraints and a decision is made as to whether that activity is required to be performed in order to realize the product. Factors such as time required to perform the activity, availability of the equipment, cost of the operation, and evaluation as to whether equivalent operations exist are considered. The selected manufacturing operations on the optimum path must obviously be performed in some order, so a precedence relationship between each of the operations is established. Artificial intelligence programs that run on a digital computer are useful to establish the precedence relationships based on algorithms and logical rules.

The database or databank of the computer model 215 is processed by a translator 224 to convert it into a solids model for use by the manufacturing activities or operations that lie on the optimum path 223. The two critical communication links that significantly enhance the rapid product realization process are bi-directional transfer of information between the computer model 215 and the CAD model 225, and transfer of computer model 215 information to the downstream rapid prototyping systems that lie on the optimum path 223. However, because these models are targeted at two distinctly different domains, their data structures are not designed to be compatible with each other. To successfully use surface or wireframe geometry as the basis for creating solid models, the surface geometry should contain not only the mathematical definition of surfaces, but also the topology which defines how surfaces are connected together. Topology information ensures that the CAD model of a part is not just a haphazard collection of surfaces thrown together, but a coherent set of congruent surfaces with no gaps between them. The topology also ensures that valid geometry will be created when the surfaces are stitched together to produce a solid model. The major differences between wireframe, surface and solid models are that the surface model has gaps and discontinuities, whereas the solid model is smooth and continuous. These are caused by the lack of topological information in the models and the low precision mathematical foundation of the surface model. For effective conversion of surface geometry to solid models, the surface model must meet stringent requirements in terms of accuracy and tangent continuity. The construction techniques and geometry tolerances used in the surface model can yield mathematically correct solids models free of surface normal, closure and continuity problems if the outward normals of the surface geometry are pointing in the proper direction as required by stereolithography (SLA) and other free-form manufacturing operations such as CNC machining. To effect a clean transfer of product geometry between the two models, the IGES interfaces are optimized to enable the seamless transfer of surface models into solid models and to use these surfaces as templates to build the solid models. The solid model thus created is used to build physical models using many of the rapid prototyping technologies such as SLA, CNC, LOM, etc. Of equal importance is the ability to transfer a subset of solids model geometry back to the surface model database for additional detailed styling and rendering. Since only the outer envelope geometry of a part is needed for visualization purposes, only a subset of the solid geometry needs to be exported in this direction. This second data flow path enables the direct transfer of surface geometry to SLA or other similar free-form prototyping systems to rapidly build physical models.

Optionally, this or other processing steps may add information to the CAD model 225 that is representative of internal features or other product details that were not found in the surface model. Since the surface model by definition only represents the exterior of the product, features and details that are on the inside of the product can only be added in the solid model, and it is appropriate to do so at this time. Other information, such as tool path information, source codes, and slicing information for by the SLA equipment may be added by the downstream manufacturing operations 230. The amount and type of information added to the CAD model 225 database is dependent on the individual activities that lie on the optimum path and the precedence relationship that was established. One result of the processing step is that a directed data flow between each of the individual manufacturing operations on the optimum path is created. The selected manufacturing operations are now performed in the order established by the precedence relationship, and the processed data in the CAD model 225 is transferred to the selected manufacturing operations either serially or concurrently, so that each may be performed in an optimal manner to reduce the total cycle time required to manufacture the product to a minimum. Each of the selected manufacturing operations performs an activity that is a step in the optimal manufacture of the product. If necessary, the output of one activity is sent to the next activity to be further modified or acted upon. For example, a master part may be fabricated using an SLA, and the master part is then used to build a mold using the RTV process or a spray metal process (flame spraying metal onto the master part), the mold then used with the RIM operation to form a plastic part. Or, a CNC machine may directly create a steel mold having a cavity representative of the product, which is then used in an injection molding machine to make the plastic part by injecting resin into the mold. The manufacturing operations typically, but not exclusively, employ computer controlled processes that are responsive to a version of the CAD model databank.

In certain cases, there may be multiple manufacturing operations that are essentially the same. For example, as shown in the manufacturing operations step 230, several SLA stations are included in the set of operations, and any single one of them could be chosen to perform the activity. If each one contained a different type of liquid resin, then the one containing the resin that best fits the criteria in the set of constraints would be chosen. Or, alternatively, several operations could be integrated together, such as partially creating some portion of the product from one type of resin and then fabricating the remainder of the part around that portion. A similar situation applies to other operations such as CNC machining, molding, etc. where multiple stations or vendors exist to perform the same job, each at a different rate, quality and/or price. The net result of the sequence of steps on the optimum path is that the last one results in the product realization 235. At this point, one or more units of the product are available for evaluation and testing, and it is compared to the original concept as envisioned by the designer. If the product meets the specifications, such as fit and form, size, appearance, and functionality, the process is complete. If not, either the computer model or the CAD model is modified to iterate the database and another pass is made through the rapid product realization process. By liking the individual systems together in a controlled and structured manner, a product may be realized in a much faster and economically preferable way, thereby decreasing the time to market.

A specific example of one product realization process is now illustrated. It is to be understood that this is an example, and is presented as a single case, and is not meant to otherwise limit the appended claims.

EXAMPLE 1

A housing for a radio was made in accordance with one embodiment of the invention. A rendering of the housing was made by a designer using Alias on a computer workstation. A set of constraints including available budget, total cycle time, number of units required, and physical properties of the plastic housing were defined. The optimum path was chosen based on these constraints. The Alias surface model database was used to directly prepare the data for the SLA manufacturing process in less than 4 hours. An SLA part was built in about 5 hours, with the total cycle-time amounting to 9 hours. The SLA part was then used to make an RTV mold for a low-pressure, reaction-injection molding (RIM) process. A flexible mold was made from an elastomeric material which is inert, selfsupporting and remains substantially free from interaction with the material to be molded. The use of an elastomeric material allowed production of complex parts that have backdrafts or undercuts, without necessitating the need for expensive and costly mechanisms in the mold, such as slides and pulls. The elastomer can be flexed, thereby facilitating withdrawal of the molded article from the mold. The molding tool has a rigid mold box surrounding all sides of the mold in order to contain the elastomer and prevent distortion of the mold during filling. The sidewalls of the mold box are slanted at an angle to aid in removing the elastomeric mold from the mold box. This allowed a low cost, easily fabricated mold tool to be used with a pressurized RIM processes, thereby significantly increasing the productivity of the tool. The RIM process provided rapid cycle time thus producing a larger number of parts in a given time. In addition, the polyurethane material used to make the RIM parts had superior mechanical properties as compared with materials used for conventional gravity east systems. The RIM process provided small, precision part with very thin wall sections, and housings in various colors were fabricated by adding appropriate coloring agents to the urethane resin prior to molding. The polyurethane housings were assembled together to create working prototypes of the product, which were then subjected to physical, mechanical, electrical and marketing testing. The total cycle time for this process off concept-surface model-constraints-optimum path-SLA part-RTV mold-multiple RIM parts was one week, which was significantly faster than the traditional route of: paper sketches-transfer of the sketch to a CAD database-cutting a steel moldinjection molding, which consumed a total cycle time of 7–16 weeks and required a significantly greater financial outlay.

EXAMPLE 2

A housing for another radio was made in accordance with another embodiment of the invention. A rendering of the radio was made by a designer using Alias on a computer workstation. A set of constraints including available budget, total cycle time, number of units required, and physical properties of the plastic housing were defined. The optimum path was chosen based on these constraints. The Alias surface model database was processed to provide a database that was directly used to create an aluminum mold on a CNC machine. The mold was then placed in an injection molding machine, and parts were produced using polycarbonate plastic. The polycarbonate was the same grade of plastic material that is used in the production version of the product, and the molded housings were then subjected to physical and environmental testing to evaluate the ruggedness of the radio.

In summary, the instant invention enables one to create physical prototypes from surface models in less than one day. These rapid prototypes are built directly from the surface model by transferring information to construct solid models. This enables rapid iteration of designs while shortening the product design cycle, leading to improved product quality and cycle-time. Surface and wireframe geometry was used as a template for the construction of solid models Bi-directional transfer of surface/wireframe geometry between the two systems facilitates rapid physical prototypes realization. Surface model geometry was transferred to a solids model, and mechanical prototypes were fabricated to verify the suitability of the fit. The ability to quickly perform these checks during the early stages of the design cycle eliminated many re-design and re-engineering activities. Now, once a concept is finalized, it is possible to quickly move from concept design to detailed engineering prototypes. This leads to increased synergy between product form and function, resulting in higher quality products developed in a shorter period of time.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for optimally realizing a product, comprising:
   creating a first set of data corresponding to the product;
   defining a set of constraints for the product;
   determining an optimum path through a plurality of manufacturing operations that is based on the set of constraints;
   identifying the manufacturing operations that are on the optimum path and defining a precedence relationship between the identified operations;
   transforming the first set of data into a second set of data based on the defined precedence relationship to generate a directed data flow between the identified operations; and
   directing the second set of data between the identified operations in accordance with the directed data flow, whereby each of the identified operations performs an activity to optimally manufacture the product.

2. The method as described in claim 1, wherein the step of determining an optimum path comprises:
   evaluating each of the manufacturing operations based on the set of constraints; and
   choosing one or more of the evaluated operations.

3. The method as described in claim 1, wherein the step of identifying the manufacturing operations on the optimum path further comprises defining a set of interconnected relationships between the identified operations.

4. The method as described in claim 1, wherein the step of creating a first set of data comprises creating a computer model of the product.

5. The method as described in claim 4, wherein the computer model is a solids model.

6. The method as described in claim 1, wherein the step of determining an optimum path comprises evaluating individual operations in the plurality of operations and determining whether a function performed by that individual operation is required to realize the product.

7. The method as described in claim 6, further comprising estimating the time required to perform the operation.

8. The method as described in claim 7, further comprising determining the availability of each of the operations.

9. The method as described in claim 1, wherein the step of determining an optimum path comprises estimating the cost required to perform the operation.

10. The method as described in claim 1, wherein the step of determining an optimum path comprises selecting a single manufacturing operation from among a plurality of manufacturing operations that perform a similar function.

11. The method as described in claim 1, wherein the set of constraints includes one or more constraints selected from the group consisting of the number of units of realized product that are desired, the quality of the realized product, the cost of the realized product, and the amount of time required to realize the product.

12. The method as described in claim 1, wherein the set of constraints is based in part on the first set of data.

13. A process for designing and optimally fabricating a plastic object, comprising the steps of:
    creating a model of the object using a databank in a digital computer;
    defining a set of constraints for the object;
    determining an optimum path through a plurality of manufacturing processes using the defined set of constraints;
    selecting from the plurality of manufacturing processes those processes that lie on the optimum path and defining a precedence relationship between the selected processes to create a set of interconnected activities;
    transforming the databank into a second databank that contains information that is usable by each of the selected processes, and sending the information to each of the selected processes; and
    performing an activity at each selected process in accordance with the defined precedence relationship, whereby an output of the last one of the selected processes is the plastic object.

14. A rapid product realization process, comprising the steps of:
    creating a first computer databank representative of a surface model of the product, the databank containing information about the exterior of the product;
    translating the surface model into a solid model by processing the first databank to create a second databank that is a solid model of the product;
    fabricating a master part that is a physical representation of the product using a machine responsive to the second databank;
    fabricating a mold tool having a cavity representative of the product; and
    fabricating the product by filling the mold tool cavity with a plastic resin.

15. The process is described in claim 14, wherein the step of fabricating a master part comprises using stereolithography or CNC machining.

16. The process as described in claim 15, wherein the mold tool is fabricated from the master part by casting a tool using room temperature vulcanizing silicone rubber or by spray metal technology.

17. A rapid product realization process, comprising the steps of:
    creating a first computer databank representative of a surface model of the product, the databank containing information about the exterior of the product;
    translating the surface model into a solid model by processing the first databank to create a second databank that is a solid model of the product;
    fabricating a mold tool using a CNC machine or a stereolithography apparatus responsive to the second databank, the mold tool having a cavity representative of the product; and
    fabricating the product by filling the mold tool cavity with a plastic resin.

18. A rapid product realization process, comprising the steps of:
    creating a first computer databank representative of a surface model of the product, the databank containing information about the exterior of the product;
    translating the surface model into a solid model by processing the first databank to create a second databank that is a solid model of the product;
    adding information representative of internal features of the product to the second databank;
    fabricating a mold tool having a cavity representative of the product; and
    fabricating the product by filling the mold tool cavity with a plastic resin.

19. A rapid product realization process, comprising the steps of:
    creating a first computer databank representative of a surface model of the product by inputting information into a computer, the databank containing information about the exterior of the product;
    translating the surface model into a solid model by processing the first databank to create a second databank that is a solid model of the product;
    fabricating a mold tool having a cavity representative of the product; and
    fabricating the product by filling the mold tool cavity with a plastic resin.

20. A rapid product realization process, comprising the steps of:
    creating a first computer databank representative of a surface model of the product, the databank containing information about the exterior of the product;
    translating the surface model into a solid model by processing the first databank to create a second databank that is a solid model of the product;
    fabricating a mold tool having a cavity representative of the product; and
    fabricating the product by filling the mold tool cavity with a plastic resin by means of reaction injection molding or high pressure injection molding.

21. The process as described in claim 20, wherein the step of fabricating the product comprises molding using a plastic resin having an added coloring agent.

22. A process for rapidly realizing a product from concept to finished parts, comprising the steps of:
    creating a first computer databank representative of a surface model of the product, the databank containing information about the exterior of the product;
    translating the surface model into a solid model by processing the first databank to create a second databank that is a solid model of the product;
    fabricating a master part that is a physical representation of the product using the second databank to fabricate a master part using stereolithography or computer numeric controlled machining;

fabricating a mold tool from the master part by casting a tool using room temperature vulcanizing silicone rubber or by flame spraying, the mold tool having a cavity representative of the product; and fabricating the product by injection molding plastic resin into the mold tool cavity.

23. The rapid product realization process as described in claim 22, further comprising a step of adding information representative of internal features of the product to the second databank, after the step of translating the surface model into a solid model and prior to the step of fabricating a master part.

24. The method as described in claim 1, wherein the second set of data is transformed into a third set of data that is used by an identified operation to perform an activity to optimally manufacture the product.

* * * * *